(12) United States Patent
Stachowski et al.

(10) Patent No.: US 6,720,750 B2
(45) Date of Patent: Apr. 13, 2004

(54) METHOD FOR TILTING A SEAT OF A VEHICLE

(75) Inventors: Stephen M. Stachowski, Canton, MI (US); Kevin J. Pavlov, Livonia, MI (US); Pahngroc Oh, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/182,543

(22) PCT Filed: Nov. 27, 2001

(86) PCT No.: PCT/US01/44503

§ 371 (c)(1),
(2), (4) Date: Jul. 25, 2002

(87) PCT Pub. No.: WO02/42113

PCT Pub. Date: May 30, 2002

(65) Prior Publication Data

US 2003/0098662 A1 May 29, 2003

Related U.S. Application Data

(60) Provisional application No. 60/253,317, filed on Nov. 27, 2000.

(51) Int. Cl.[7] .............................. H02P 3/10; B60N 2/42; B60R 21/00
(52) U.S. Cl. .............. 318/466; 297/216.19; 297/217.13
(58) Field of Search ................................. 318/489, 478, 318/468, 470, 461–464, 466, 467, 456–458, 449, 450, 584–587, 626; 297/217.3, 216.19; 180/325, 326, 328, 330; 248/550, 651–654, 664, 352

(56) References Cited

U.S. PATENT DOCUMENTS

| 3,452,834 A |   | 7/1969  | Gaut             |         |
|-------------|---|---------|------------------|---------|
| 3,732,944 A | * | 5/1973  | Kendall          | 180/274 |
| 4,722,550 A |   | 2/1988  | Imaoka et al.    |         |
| 4,900,079 A |   | 2/1990  | Obara et al.     |         |
| 4,924,162 A |   | 5/1990  | Sakamoto et al.  |         |
| 5,125,472 A | * | 6/1992  | Hara             | 180/271 |
| 5,130,622 A |   | 7/1992  | Takizawa et al.  |         |
| 5,263,765 A |   | 11/1993 | Nagashima et al. |         |
| 5,320,409 A |   | 6/1994  | Katoh et al.     |         |
| 5,490,706 A |   | 2/1996  | Totani           |         |
| 5,556,160 A |   | 9/1996  | Mikami           |         |
| 5,567,006 A |   | 10/1996 | McCarthy         |         |

(List continued on next page.)

FOREIGN PATENT DOCUMENTS

| DE | 19823058 A1 | 12/1999 |
| JP | 63315342    | 12/1988 |

OTHER PUBLICATIONS

PCT Publication, WO 00/12350, Mar. 9, 2000.

*Primary Examiner*—Robert E. Nappi
*Assistant Examiner*—Patrick Miller
(74) *Attorney, Agent, or Firm*—Brinks Hofer Gilson & Lione

(57) ABSTRACT

A method for tilting a seat of a vehicle based on a first threshold (low) and a first threshold (high) for a first parameter of the vehicle and a second threshold (low) and a second threshold (high) for a second parameter of the vehicle. The tilt angle of the seat is increased if the first parameter is greater that or equal to the first threshold (low) and the second parameter is greater than or equal to the second threshold (high) or if the parameter is greater than or equal to the first threshold (high) and the second parameter is greater than or equal to the second threshold (low).

14 Claims, 2 Drawing Sheets

U.S. PATENT DOCUMENTS

| | | | |
|---|---|---|---|
| 5,610,575 A | * 3/1997 | Gioutsos | 340/429 |
| 5,707,109 A | 1/1998 | Massara et al. | |
| 5,743,591 A | 4/1998 | Tame | |
| 5,975,508 A | 11/1999 | Beard | |
| 6,024,378 A | 2/2000 | Fu | |
| 6,037,731 A | 3/2000 | Fruehauf et al. | |
| 6,056,079 A | 5/2000 | Cech et al. | |
| 6,059,253 A | 5/2000 | Koutsky et al. | |
| 6,076,887 A | * 6/2000 | Andersson | 297/216.1 |
| 6,088,642 A | 7/2000 | Finkelstein et al. | |
| 6,120,082 A | 9/2000 | Vandermolen | |
| 6,122,568 A | 9/2000 | Madau et al. | |
| 6,182,783 B1 | 2/2001 | Bayley | |
| 6,193,297 B1 | 2/2001 | Vandermolen | |
| 6,244,656 B1 | * 6/2001 | Mueller | 297/216.13 |
| 6,301,536 B1 | * 10/2001 | Vaessen et al. | 701/45 |
| 6,302,481 B1 | * 10/2001 | Swann et al. | 297/216.18 |
| 6,386,345 B1 | * 5/2002 | Hamilton et al. | 188/276 |
| 6,394,495 B1 | * 5/2002 | Specht | 280/806 |
| 6,416,126 B1 | * 7/2002 | H.ang.land et al. | 297/216.13 |

\* cited by examiner

METHOD FOR TILTING A SEAT OF A VEHICLE

CROSS-REFERENCE TO PRIOR APPLICATIONS

The present invention claims priority to U.S. Provisional Application Ser. No. 60/253,317, filed Nov. 27, 2000 and entitled "Dynamic Adjustable Seating".

TECHNICAL FIELD

The present invention relates generally to a method for tilting a seat of a vehicle and, more particularly, to a method for tilting a seat based on multiple parameters with multiple thresholds.

DESCRIPTION OF THE PREFERRED METHOD

The following description of the preferred method is not intended to limit the invention to the preferred method, but rather to enable any person skilled in the art of vehicle seats to make and use this invention.

Figure 1:
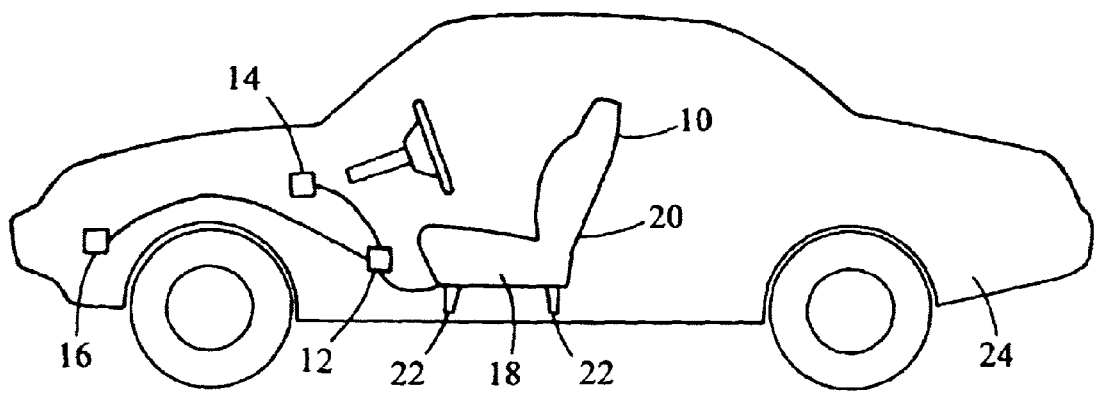
FIG. 1 is a side view of a seat in a vehicle tiltable by the preferred method of the invention.
Figure 2:
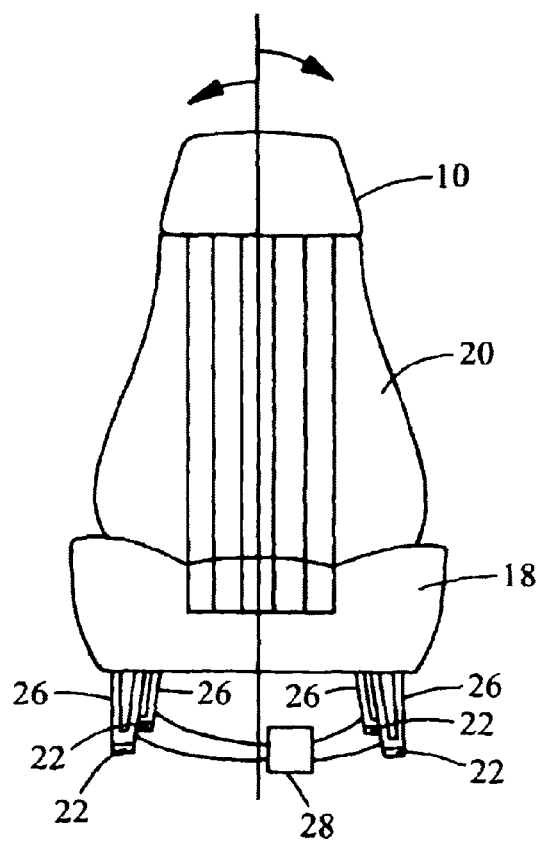
FIG. 2 is a front view of the seat of FIG. 1.

As shown in FIGS. 1 and 2, the preferred method of the invention is preferably used with a seat 10, a control unit 12, a first sensor 14, and a second sensor 16. The seat 10, which functions to support a passenger or driver includes a seat section 18, a back section 20, and a tilt mechanism 22. Although the preferred method has been specifically designed for tilting the seat 10 of a vehicle 24, the preferred method may be designed and used with a seat in other suitable environments, such as in a watercraft or in an aircraft.

As shown in FIG. 2, the seat section 18 and the back section 20 of the seat 10 are preferably made in a conventional manner which includes providing a metal frame, a foam cushion, and a cloth or leather trim (not shown). The seat section 18 and the back section 20 may alternatively be made in any suitable manner. The back section 20 is preferably connected to the seat section 18 with a conventional angle-adjustable mechanism (not shown), but may alternatively be connected with any suitable device. The seat section 18 is preferably connected to the tilting mechanism 22, which is preferably connected to the vehicle.

The tilt mechanism 22 of the seating system, which functions to adjust the angle of the occupant of the seat 10 relative to the vehicle during a situation of lateral acceleration, is preferably made in a conventional manner, which includes gas struts 26 and a pneumatic pump 28. Conventional gas struts 26, used in a seat suspension system, are generally described in U.S. Pat. No. 6,059,253 issued on May 9, 2000 and assigned to Sears Manufacturing Company, which is hereby incorporated in its entirety by this reference. The tilt mechanism 22 may alternatively be made in any suitable manner, such as with hydraulic struts and a hydraulic pump, or with a mechanical plunger and a motor. The gas strut 26 is preferably connected to the outer corners of the seat section 18 with conventional fasteners (not shown), but may alternatively be connected to the seat section 18 with any suitable fastener. The seat 10 preferably includes four tilt mechanisms 22, but may alternatively include one or more tilt mechanisms 22 at any suitable location. The pneumatic pump 28 is preferably located under the seat section 18 of the seat 10, but may alternatively be located at any suitable location in the vehicle 24.

The control unit 12, which functions to receive and process data regarding the first parameter and the second parameter and to output an appropriate signal to the tilt mechanism 22, is preferably made in a conventional manner, which includes a microprocessor and a memory device (not shown). The control unit 12 may alternatively be made in any other suitable manner. The control unit 12 is preferably located within a floor of the vehicle, but may alternatively be located in any suitable location in the vehicle.

As shown in FIG. 1, the sensing of the first parameter and the second parameter is preferably accomplished by the first sensor 14 and the second sensor 16, respectively. In one version of the preferred method, the first parameter includes a steering angle of a steering device of the vehicle 24, while the second parameter includes a speed of the vehicle 24. In a second version of the preferred method, the first parameter includes a lateral acceleration of the vehicle 24, while the second parameter includes a yaw rate of the vehicle 24. In both versions of the preferred method, two parameters of the vehicle 24 are used to approximate the situations in which the driver or passenger on the seat 10 of the vehicle 24 may prefer or need to have an increased tilt angle of the seat 10. The increased tilt angle of the seat 10 may allow the driver or passenger on the seat 10 to better react against the centrifugal forces induced by a turn or the lateral acceleration induced by the road. In the first version of the preferred method, the first sensor 14 is a conventional steering wheel angle sensor coupled to the steering wheel of the vehicle 24, while the second sensor 16 is a conventional speed sensor connected to the wheels of the vehicle 24. In the second version of the preferred method, the first sensor 14 is a conventional lateral acceleration sensor, while the second sensor 16 is a conventional yaw rate sensor, both located in any suitable location within the vehicle 24. In alternative versions of the preferred method, the first parameter and the second parameter may include any suitable combination of parameters and any suitable combination of sensors.

Figure 3:
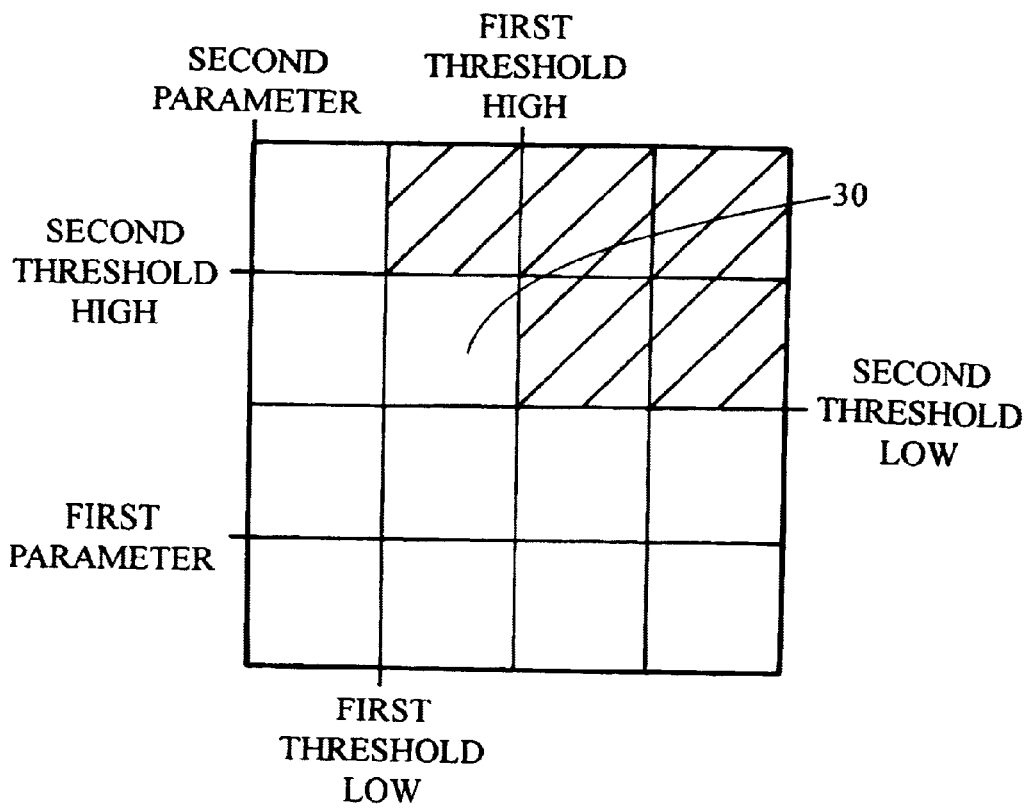
FIGS. 3 and 4 are graphical representations of the two parameter with multiple threshold activation of the preferred method of the invention.

As shown in FIG. 3, the preferred method activates the tilt mechanism based on multiple thresholds of two parameters. The activation of the tilt mechanism is based on a first threshold$_{low}$ for the first parameter, a first threshold$_{high}$ for the first parameter, a second threshold$_{low}$ for the second parameter, and a second threshold$_{high}$ for the second parameter. The first threshold$_{low}$<first threshold$_{high}$ and the second threshold$_{low}$<second threshold$_{high}$. Based on the preferred method, if the first parameter≧first threshold$_{low}$ and the second parameter≧second threshold$_{high}$, the control unit will send a signal to the tilt mechanism to increase the tilt angle of the seat. The control unit will also send a signal to the tilt mechanism to increase the tilt angle if the first parameter≧first threshold$_{high}$ and the second parameter≧second threshold$_{low}$. In this manner, there is a non-tilt region 30 where first threshold$_{low}$≦first parameter<first threshold$_{high}$ and second threshold$_{low}$≦second parameter<second threshold$_{high}$, in which the control unit maintains, and does not increase, the tilt angle of the seat.

Figure 4:
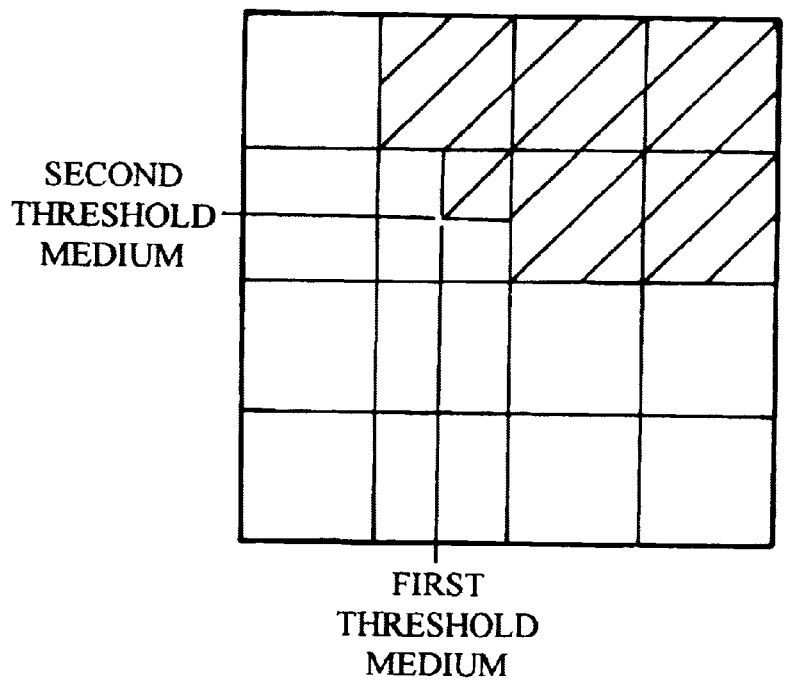

Activation of the tilt mechanisms may be based upon more than just two thresholds for the first parameter and the second parameter. As shown in FIG. 4, activation is also based on a first threshold$_{med}$ for the first parameter and a second threshold$_{med}$ for the second parameter. The first threshold$_{low}$<first threshold$_{med}$<first threshold$_{high}$ and the second threshold$_{low}$<second threshold$_{med}$<second threshold$_{high}$. In this version of the preferred method, the control unit also sends a signal to the tilt mechanism to increase the tilt angle if the first parameter≧first threshold$_{med}$ and the second parameter≧second threshold$_{med}$. In further versions of the preferred method, activation may be based on dozens of thresholds for the first parameter and the second parameter, such that the graphical representation of the thresholds approaches a smoothly curved line.

The multiple thresholds, including the first threshold$_{low}$, first threshold$_{med}$, first threshold$_{high}$, second threshold$_{low}$, second threshold$_{med}$, and second threshold$_{high}$, are preferably stored within the memory device of the control unit. These thresholds are preferably set by the supplier or manufacturer of the seat, but may alternatively be set or modified by the driver or passenger of the vehicle. Further, the thresholds are preferably constant, but may alternatively be adaptive to the preferences of a particular driver or passenger.

As any person skilled in the art of seating systems will recognize from the previous detailed description and from the figures and claims, modifications and changes can be made to the preferred method of the invention without departing from the scope of this invention defined in the following claims.

We claim:

1. A method for adjusting a tilt angle of a seat of a vehicle, comprising:

sensing a first parameter of the vehicle;

sensing a second parameter of the vehicle;

retrieving a first threshold$_{low}$ for the first parameter, a first threshold$_{high}$ for the first parameter, a second threshold$_{low}$ for the second parameter, and a second threshold$_{high}$ for the second parameter, wherein the first threshold$_{low}$ is less than the first threshold$_{high}$ and wherein the second threshold$_{low}$ is less than the second threshold$_{high}$; and increasing the tilt angle of the seat if the first parameter is greater than or equal to the first threshold$_{low}$ and the second parameter is greater than or equal to the second threshold$_{high}$ or if the first parameter is greater than or equal to the first threshold$_{high}$ and the second parameter is greater than or equal to the second threshold$_{low}$.

2. The method of claim 1 further comprising maintaining the tilt angle of the seat if first threshold$_{low}$ is less than or equal to the first parameter first threshold$_{high}$ and second threshold$_{low}$ is less than or equal to the second parameter is less than the second threshold$_{high}$.

3. The method of claim 2 wherein said sensing a first parameter includes sensing a steering angle of a steering device of the vehicle.

4. The method of claim 3 wherein said sensing a second parameter includes sensing a speed of the vehicle.

5. The method of claim 2 wherein said sensing a first parameter includes sensing a lateral acceleration of the vehicle.

6. The method of claim 5 wherein said sensing a second parameter includes sensing a yaw rate of the vehicle.

7. A method for adjusting a tilt angle of a seat of a vehicle, comprising:

sensing a first parameter of the vehicle;

sensing a second parameter of the vehicle;

retrieving a first threshold$_{low}$ for the first parameter, a first threshold$_{high}$ for the first parameter, a second threshold$_{low}$ for the second parameter, and a second threshold$_{high}$ for the second parameter, wherein the first threshold$_{low}$ is less than the first threshold$_{high}$ and wherein the second threshold$_{low}$ is less than the second threshold$_{high}$;

increasing the tilt angle of the seat if the first parameter is greater than or equal to the first threshold$_{low}$ and the second parameter is greater than or equal to the second threshold$_{high}$ or if the first parameter is greater than or equal to the first threshold$_{high}$ and the second parameter is greater than or equal to the second threshold$_{low}$; and retrieving a first threshold$_{med}$ for the first parameter and a second threshold$_{med}$ for the second parameter, wherein the first threshold$_{low}$ is less than the first threshold$_{med}$ is less than the first threshold$_{high}$ and wherein the second threshold$_{low}$ is less than the second threshold$_{med}$ is less than the second threshold$_{high}$.

8. The method of claim 7 further comprising increasing the tilt angle of the seat if the first parameter is greater than or equal to the first threshold$_{med}$ and the second parameter is greater than or equal to the second threshold$_{med}$.

9. The method of claim 8 wherein said sensing a first parameter includes sensing a steering angle of a steering device of the vehicle.

10. The method of claim 9 wherein said sensing a second parameter includes sensing a speed of the vehicle.

11. The method of claim 8 wherein said sensing a first parameter includes sensing a lateral acceleration of the vehicle.

12. The method of claim 11 wherein said sensing a second parameter includes sensing a yaw rate of the vehicle.

13. The method of claim 1 wherein said retrieving includes retrieving from a memory device.

14. The method of claim 1 wherein said retrieving includes retrieving from an occupant of the vehicle.

* * * * *